(12) United States Patent
Fukada et al.

(10) Patent No.: US 10,968,136 B2
(45) Date of Patent: Apr. 6, 2021

(54) TEMPERED GLASS

(71) Applicant: Nippon Electric Glass Co., Ltd., Shiga (JP)

(72) Inventors: Mutsumu Fukada, Shiga (JP); Kiyotaka Kinoshita, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 546 days.

(21) Appl. No.: 15/780,029

(22) PCT Filed: Sep. 16, 2016

(86) PCT No.: PCT/JP2016/077600
§ 371 (c)(1),
(2) Date: May 30, 2018

(87) PCT Pub. No.: WO2017/094329
PCT Pub. Date: Jun. 8, 2017

(65) Prior Publication Data
US 2018/0346376 A1 Dec. 6, 2018

(30) Foreign Application Priority Data
Dec. 4, 2015 (JP) .............................. JP2015-237731

(51) Int. Cl.
*C03C 21/00* (2006.01)
*C03C 3/091* (2006.01)

(52) U.S. Cl.
CPC ............ *C03C 21/002* (2013.01); *C03C 3/091* (2013.01)

(58) Field of Classification Search
CPC ............................... C03C 21/002; C03C 3/091
(Continued)

(56) References Cited

U.S. PATENT DOCUMENTS

2011/0294648 A1   12/2011   Chapman et al.
2014/0370264 A1*  12/2014   Ohara .................... G06F 1/1626
                                                                    428/220
(Continued)

FOREIGN PATENT DOCUMENTS

CN    102971267    3/2013
JP    2016-44119   4/2016
WO    2013/088856  6/2013

OTHER PUBLICATIONS

International Preliminary Report on Patentability and Written Opinion of the International Searching Authority dated Jun. 5, 2018 in International (PCT) Application No. PCT/JP2016/077600.
(Continued)

*Primary Examiner* — Tahseen Khan
(74) *Attorney, Agent, or Firm* — Wenderoth, Lind & Ponack, L.L.P.

(57) ABSTRACT

Provided is a tempered glass, including, on a surface thereof, a compressive stress layer having a compressive stress, and including a tensile stress layer having a tensile stress inside the compressive stress layer, wherein the tempered glass satisfies the following expression (1): DZ/DT<0.65 ... (1) where DZ represents a zero stress depth (µm) indicating a depth from the surface to a reference position at which a stress becomes zero between the compressive stress layer and the tensile stress layer, and DT represents an alkali metal diffusion depth (µm) indicating a depth of a region layer, which has diffused therein an alkali metal ion that causes the compressive stress, from the surface, and wherein the tempered glass satisfies the following expression (2): CTM<73 ... (2) where CTM represents a maximum tensile stress (MPa).

20 Claims, 1 Drawing Sheet

(58) Field of Classification Search
USPC .......................................................... 428/220
See application file for complete search history.

(56) References Cited

U.S. PATENT DOCUMENTS

| | | | |
|---|---|---|---|
| 2015/0329418 A1* | 11/2015 | Murata | C03C 17/23 |
| | | | 428/215 |
| 2017/0217824 A1 | 8/2017 | Ohara et al. | |
| 2018/0037498 A1 | 2/2018 | Ohara et al. | |
| 2018/0044232 A1 | 2/2018 | Ohara et al. | |

OTHER PUBLICATIONS

International Search Report dated Nov. 8, 2016 in International (PCT) Application No. PCT/JP2016/077600.
Office Action dated Apr. 23, 2020 in corresponding Chinese Patent Application No. 20160055620.2, with partial English translation.

* cited by examiner

TEMPERED GLASS

TECHNICAL FIELD

The present invention relates to a tempered glass, and more particularly, to a tempered glass suitable for a cover glass for a cellular phone, a digital camera, a personal digital assistant (PDA), or a touch panel display.

BACKGROUND ART

Devices such as a cellular phone (in particular, a smartphone), a digital camera, a PDA, a touch panel display, a large-screen television, and contact-less power transfer show a tendency of further prevalence. In those applications, a tempered glass obtained through ion exchange treatment has been used. In addition, in recent years, the use of the tempered glass in exterior components of a digital signage, a mouse, a smartphone, and the like is increasing.

Incidentally, as described above, the tempered glass has been used in a cover glass for a portable device, such as a smart phone, but the cover glass may break at the time of the dropping of the portable device.

Such breakage of the cover glass due to the dropping may occur in various modes. In, for example, Patent Literature 1, reference is made to two breakage modes. One of the modes is a slow cracking mode in which the cover glass cracks at a relatively slow speed with a scratch, which penetrates a compressive stress layer at the time of the application of impact to the glass, for example, in the case of its dropping, as an origin. The other is a non-slow cracking mode in which after the formation of a fracture origin shallower than the depth of the compressive stress layer, fracture is advanced by a large stress and hence a crack rapidly grows. In Patent Literature 1, there is a disclosure of a tempered glass having high resistance to the former, that is, the slow crack.

CITATION LIST

Patent Literature 1: WO 2013/088856 A1

SUMMARY OF INVENTION

Technical Problem

However, the modes of the breakage of a tempered glass are not limited to the above-mentioned two modes. Analysis by the inventors of the present invention has revealed that at least the following plurality of modes exist.

(1) A first mode is a mode in which there is a sharp protruding object at a drop destination, the protruding object pierces the surface compressive stress layer of the tempered glass to reach its internal tensile stress layer, to thereby cause a crack, and the crack extends owing to an internal tensile stress to break the tempered glass. The so-called slow cracking is also included in the first mode.

(2) A second mode is a mode in which there is a blunt protruding object at a drop destination, and the protruding object forms a crack with such a depth as not to penetrate the surface compressive stress layer of the tempered glass and applies a tensile stress having a magnitude larger than that of a compressive stress to the surface of the tempered glass to extend the crack, to thereby break the tempered glass. The so-called non-slow cracking is also included in the second mode.

(3) A third mode is a mode in which a bending stress is locally applied to the inside of the surface of the tempered glass by impact applied to the surface, and a microcrack that the tempered glass has is extended by the stress to break the tempered glass.

In particular, the breakage resulting from the internal tensile stress like the first mode and the breakage resulting from the bending stress like the third mode account for a large ratio of causes for the breakage of a cover glass for a smart phone. Therefore, a tempered glass to be used in such application desirably has high strengths for both the first mode and the third mode.

However, the tempered glass disclosed in Patent Literature 1 is intended to improve a strength in one mode (slow cracking), and a high strength has not necessarily been obtained in any other mode. That is, in the related art, a sufficient investigation has not been performed on the following: high resistance is obtained in each of a plurality of modes with reliability.

The present invention has been made in view of the circumstances, and an object of the present invention is to provide a tempered glass having high strength resistance not only to breakage resulting from an internal tensile stress but also to breakage resulting from a bending stress.

Solution to Problem

A tempered glass according to one embodiment of the present invention comprises, on a surface thereof, a compressive stress layer having a compressive stress, and comprises a tensile stress layer having a tensile stress inside the compressive stress layer, wherein the tempered glass satisfies the following expression (1):

$$DZ/DT<0.65 \qquad (1)$$

where DZ represents a zero stress depth (µm) indicating a depth from the surface to a reference position at which a stress becomes zero between the compressive stress layer and the tensile stress layer, and DT represents an alkali metal diffusion depth (µm) indicating a depth of a region layer, which has diffused therein an alkali metal ion that causes the compressive stress, from the surface, and wherein the tempered glass satisfies the following expression (2):

$$CTM<73 \qquad (2)$$

where CTM represents a maximum tensile stress (MPa).

With such configuration, high resistance to breakage in each of the first mode and the third mode described above is obtained.

It is preferred that the tempered glass according to the embodiment of the present invention satisfy the following expression (3):

$$CS(25) \geq 90 \qquad (3)$$

where CS (25) represents a compressive stress value (MPa) at a depth of 25 µm from the surface.

With such configuration, high resistance to breakage in the second mode described above is also obtained.

In the tempered glass according to the embodiment of the present invention, it is preferred that the alkali metal diffusion depth DT be 50 µm or more.

With such configuration, high resistance to the breakage in the third mode is obtained more reliably.

It is preferred that the tempered glass according to the embodiment of the present invention have a thickness of 1.0 mm or less, and a maximum value of the compressive stress in the compressive stress layer be 600 MPa or more.

With such configuration, a strength more suitable and more sufficient for a portable display device, such as a smart phone, can be exhibited.

In the tempered glass according to the embodiment of the present invention, it is preferred that, when a function curve indicating a value for the compressive stress with a depth from the surface as a variable is obtained by fitting involving using a complementary error function, a square error of the function curve with respect to the complementary error function be 0.995 or less.

With such configuration, high resistance can also be obtained for a fourth mode in which at the time of the application of impact that causes a tensile stress in the surface of the tempered glass in a situation in which a scratch that can be visually observed is present in the surface of the tempered glass, a crack extends from the scratch to break the tempered glass.

It is preferred that the tempered glass according to the embodiment of the present invention comprise as a glass composition, in terms of mol %, 50% to 80% of $SiO_2$, 5% to 30% of $Al_2O_3$, and 5% to 25% of $Na_2O$. It is more preferred that the tempered glass according to the embodiment of the present invention further comprise as a glass composition, in terms of mol %, 0.01% to 10% of $P_2O_3$ and 0.01% to 3% of $SnO_2$.

With such configuration, ion exchange efficiency is improved and hence the tempered glass of the present invention is obtained with high productivity.

Advantageous Effects of Invention

According to the present invention, the tempered glass having high strength resistance not only to breakage resulting from an internal tensile stress but also to breakage resulting from a bending stress is obtained.

DESCRIPTION OF EMBODIMENTS

A tempered glass according to an embodiment of the present invention is described below.

Figure 1:
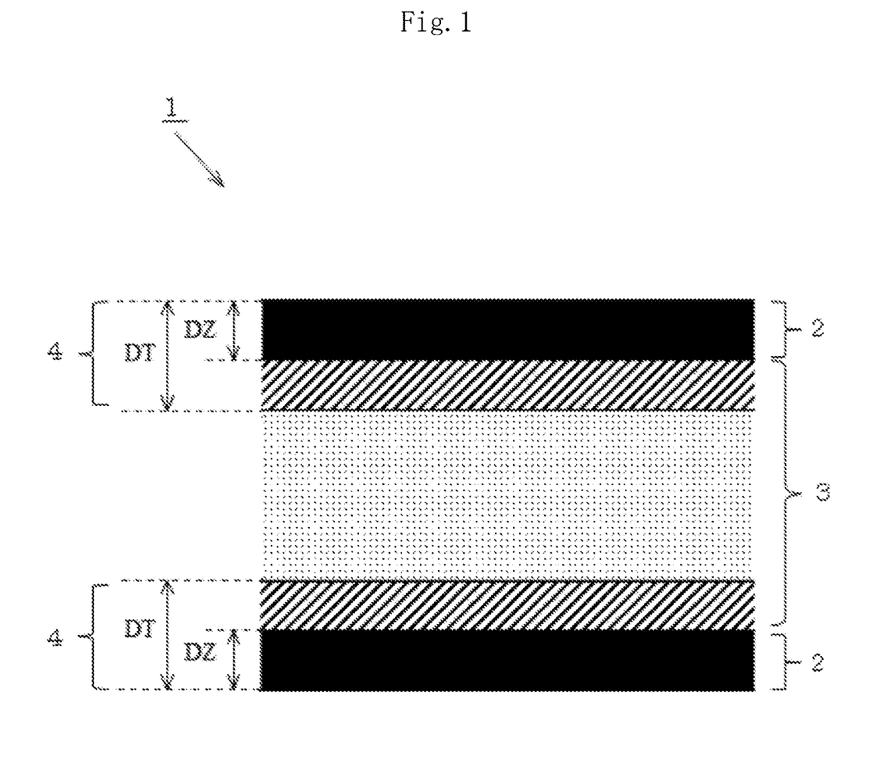
FIG. 1 is a sectional view for illustrating the schematic configuration of a tempered glass according to an embodiment of the present invention.

As illustrated in FIG. 1, a tempered glass 1 according to the embodiment of the present invention comprises, on its surface, a compressive stress layer 2 having a compressive stress. In addition, the tempered glass 1 comprises a tensile stress layer 3 having a tensile stress inside the compressive stress layer 2 in its sheet thickness direction. Such compressive stress layer 2 and tensile stress layer 3 may each be formed by, for example, subjecting the surface of a glass to be tempered containing an alkali metal component to ion exchange through chemical tempering as described later.

The tempered glass 1 of the present invention satisfies the following expression (1):

$$DZ/DT < 0.65 \quad (1)$$

where DZ represents a zero stress depth (μm) indicating a depth from its surface to the position at which a stress becomes zero between the compressive stress layer 2 and the tensile stress layer 3, and DT represents an alkali metal diffusion depth (μm) indicating the depth of an ion diffusion layer 4, which has diffused therein an alkali metal ion that causes the compressive stress, from the surface.

A value for the DZ/DT is preferably 0.60 or less, and more preferably falls within the range of from 0.10 to 0.58. When the value for the DZ/DT is set within such range, high resistance to breakage in the above-mentioned third mode, that is, breakage resulting from a bending stress based on impact applied to the surface of the tempered glass is obtained. A verification by the inventors of the present invention has revealed that as the depth to which an exchanged ion is diffused with reference to the position at which a compressive stress value becomes zero increases, higher strength is obtained in the above-mentioned third mode.

The tempered glass 1 of the present invention further satisfies the following expression (2):

$$CTM < 73 \quad (2)$$

where CTM represents the maximum tensile stress (MPa) indicating the maximum value of the tensile stress in the case where the compressive stress and the tensile stress are each regarded as changing in a curved manner in accordance with a depth from the surface of the glass.

A value for the maximum tensile stress CTM is preferably 72 MPa or less, is more preferably 65 MPa or less, and still more preferably falls within the range of from 20 MPa to 58 MPa. When the maximum tensile stress CTM is set within such range, the maximum tensile stress CTM is sufficiently low, and hence high resistance to breakage in the above-mentioned first mode, that is, breakage resulting from the tensile stress of a crack that has started from the surface of the tempered glass to reach the tensile stress layer 3 is obtained.

In addition, the tempered glass 1 of the present invention preferably satisfies the following expression (3):

$$CS(25) \geq 90 \quad (3)$$

where CS (25) represents a compressive stress value (MPa) at a depth of 25 μm from its surface.

The CS (25) is more preferably 101 MPa or more, and still more preferably falls within the range of from 106 MPa to 500 MPa. When the CS (25) is set within the range, in, for example, the case where a sharp object enters the compressive stress layer 2, a produced tensile stress hardly exceeds the compressive stress, and hence high resistance to breakage in the second mode can be obtained.

The tempered glass 1 of the present invention is of, for example, a sheet shape, and its thickness, which may be arbitrarily determined, is, for example, 2.0 mm or less, preferably 1.0 mm or less, more preferably from 0.1 mm to 0.55 mm. With such thickness, resistance to the breakage in each of the above-mentioned modes appears more significantly.

A compressive stress CS in the compressive stress layer 2 in the tempered glass 1 of the present invention is preferably 600 MPa or more, more preferably from 750 MPa to 1,500 MPa. When the CS is more than 1,500 MPa, a tensile stress value becomes excessively large, and hence the tempered glass is liable to break in such an explosive manner as to scatter small pieces.

When the stress distribution of the tempered glass 1 is represented with an axis of ordinate indicating a stress and an axis of abscissa indicating a depth from the surface of the glass, the CS, the DZ, the DT, the CTM, and the CS (25) described above can each be defined as shown in FIG. 2. In addition, values measured with, for example, FSM-6000LE and FsmV manufactured by Orihara Industrial Co., Ltd. may be used as the CS, the CS (25), the DZ, the DT, the CTM, and the like.

With regard to the breakage of the tempered glass, in addition to the first to third modes, there exists a fourth mode in which at the time of the application of impact that causes a tensile stress in the surface of the tempered glass in a situation in which a scratch that can be visually observed is present in the surface of the tempered glass, a crack extends from the scratch to break the tempered glass.

In order that resistance to breakage in such fourth mode may be improved, the alkali metal diffusion depth DT is preferably 50 µm or more. The alkali metal diffusion depth DT is more preferably 70 µm or more, still more preferably 87 µm or more.

Resistance to the breakage in each of both the third and fourth modes can be improved by setting the alkali metal diffusion depth DT within the range.

In addition, when the function curve of a value for the compressive stress CS with respect to a depth x from the surface of the tempered glass 1 of the present invention is obtained as a fitting function using a complementary error function, a square error $R^2$ of the function curve with respect to the complementary error function is preferably 0.995 or less. The square error $R^2$ is more preferably 0.985 or less, still more preferably 0.975 or less.

The resistance to the breakage in the fourth mode can be further improved by setting the square error $R^2$ within the range.

The tempered glass 1 of the present invention may be produced by, for example, the following procedure. First, a glass that contains an alkali metal oxide as a composition and is to be subjected to tempering treatment (hereinafter referred to as "glass to be tempered") is prepared. Next, a first tempering liquid is caused to adhere to the surface of the glass to be tempered to perform ion exchange treatment (first tempering step). After that, a second tempering liquid having a $KNO_3$ concentration higher than that of the first tempering liquid is caused to adhere to the surface of the glass to perform ion exchange (second tempering step).

For example, it is preferred that the glass to be tempered comprise as a glass composition, in terms of mol %, 50% to 80% of $SiO_2$, 5% to 30% of $Al_2O_3$, and 5% to 25% of $Na_2O$, and be substantially free of $As_2O_3$, $Sb_2O_3$, and PbO. Described below are reasons why the content ranges of the respective components are restricted as described above. In the description of the content range of each component, the expression "%" means "mol %" unless otherwise specified.

$SiO_2$ is a component that forms a glass network, and the content of $SiO_2$ is preferably from 50% to 80%, from 55% to 77%, from 57% to 75%, from 58% to 74%, or from 60% to 73%, particularly preferably from 62% to 72%. When the content of $SiO_2$ is too small, vitrification does not occur easily, the thermal expansion coefficient of the glass becomes too high, and thermal shock resistance is liable to lower. Meanwhile, when the content of $SiO_2$ is too large, meltability and formability are liable to lower, and the thermal expansion coefficient becomes too low, with the result that it becomes difficult to match the thermal expansion coefficient with those of peripheral materials in use as, for example, a component of an electronic product.

$Al_2O_3$ is a component that enhances ion exchange performance, and is also a component that increases a strain point and a Young's modulus. The content of $Al_2O_3$ is preferably from 5% to 30%. When the content of $Al_2O_3$ is too small, the ion exchange performance may not be exhibited sufficiently. Thus, a suitable lower limit range of the content of $Al_2O_3$ is 5.5% or more, 6.5% or more, 8% or more, 9% or more, 10% or more, particularly 11% or more. Meanwhile, when the content of $Al_2O_3$ is too large, devitrified crystals are liable to be deposited in the glass, and it becomes difficult to form a glass sheet by an overflow down-draw method or the like. In particular, when the glass sheet is formed by the overflow down-draw method through the use of an alumina forming body, a devitrified crystal of spinel is liable to be deposited at an interface between the glass and the alumina forming body. In addition, the thermal expansion coefficient of the glass becomes too low, and hence it becomes difficult to match the thermal expansion coefficient with those of peripheral materials. In addition, acid resistance reduces and hence it becomes difficult to apply the glass to an acid treatment step. In particular, in a system in which a touch sensor is formed in a cover glass, the glass sheet is simultaneously subjected to chemical treatment. In this case, when the acid resistance is low, a problem is liable to occur in the step of etching a film made of ITO or the like. In addition, viscosity at high temperature increases, which is liable to lower the meltability. Thus, a suitable upper limit range of the content of $Al_2O_3$ is 25% or less, 20% or less, 18% or less, 16% or less, 15% or less, 14% or less, 13% or less, 12.5% or less, particularly 12% or less.

$Na_2O$ is an ion exchange component, and is also a component that lowers the viscosity at high temperature to increase the meltability and formability. In addition, $Na_2O$ is also a component that improves devitrification resistance. When the content of $Na_2O$ is too small, the meltability lowers, the thermal expansion coefficient lowers, and the ion exchange performance is liable to lower. Thus, a suitable lower limit range of the content of $Na_2O$ is 5% or more, 7% or more, more than 7.0%, 8% or more, particularly 9% or more. Meanwhile, when the content of $Na_2O$ is too large, there is a tendency that the thermal expansion coefficient becomes too high, with the result that the thermal shock resistance lowers, it becomes difficult to match the thermal expansion coefficient with those of peripheral materials, and density increases. In addition, the strain point lowers excessively, and the glass composition loses its component balance, with the result that the devitrification resistance lowers contrarily in some cases. Thus, a suitable upper limit range of the content of $Na_2O$ is 25% or less, 23% or less, 21% or less, 19% or less, 18.5% or less, 17.5% or less, 17% or less, 16% or less, 15.5% or less, 14% or less, 13.5% or less, particularly 13% or less.

For example, the following components other than the above-mentioned components may be added.

The content of $B_2O_3$ is preferably from 0% to 15%. $B_2O_3$ is a component that lowers the viscosity at high temperature and the density, stabilizes the glass to make it difficult for a crystal to deposit, and lowers a liquidus temperature. In addition, $B_2O_3$ is a component that enhances crack resistance to enhance scratch resistance. Thus, a suitable lower limit range of the content of $B_2O_3$ is 0.01% or more, 0.1% or more, 0.5% or more, 0.7% or more, 1% or more, 2% or more, particularly 3% or more. However, when the content of $B_2O_3$ is too large, coloring on the surface of the glass called weathering may occur through ion exchange, water resistance may lower, and a depth of layer is liable to decrease. Thus, a suitable upper limit range of the content of $B_2O_3$ is 14% or less, 13% or less, 12% or less, 11% or less, less than 10.5%, 10% or less, 9% or less, 8% or less, 7% or less, 6% or less, particularly 4.9% or less.

A molar ratio $B_2O_3/Al_2O_3$ is preferably from 0 to 1, from 0.1 to 0.6, from 0.12 to 0.5, from 0.142 to 0.37, from 0.15 to 0.35, or from 0.18 to 0.32, particularly preferably from 0.2 to 0.3. This allows both the devitrification resistance and the ion exchange performance to be achieved at high levels while the viscosity at high temperature is optimized. The term "molar ratio $B_2O_3/Al_2O_3$" refers to a value obtained by dividing the content of $B_2O_3$ by the content of $Al_2O_3$.

A molar ratio $B_2O_3/(Na_2O+Al_2O_3)$ is preferably from 0 to 1, from 0.01 to 0.5, from 0.02 to 0.4, from 0.03 to 0.3, from 0.03 to 0.2, from 0.04 to 0.18, from 0.05 to 0.17, or from 0.06 to 0.16, particularly preferably from 0.07 to 0.15. This allows both the devitrification resistance and the ion exchange performance to be achieved at high levels while the viscosity at high temperature is optimized. The term "$Na_2O+Al_2O_3$" refers to the total content of $Na_2O$ and $Al_2O_3$. The term "molar ratio $B_2O_3/(Na_2O+Al_2O_3)$" refers to a value obtained by dividing the content of $B_2O_3$ by the total content of $Na_2O$ and $Al_2O_3$.

$Li_2O$ is an ion exchange component and is a component that lowers the viscosity at high temperature to increase the meltability and the formability, and increases the Young's modulus. Further, $Li_2O$ has a great effect of increasing the compressive stress value among alkali metal oxides, but when the content of $Li_2O$ becomes extremely large in a glass system containing $Na_2O$ at 7% or more, the compressive stress value tends to lower contrarily. In addition, when the content of $Li_2O$ is too large, the liquidus viscosity lowers, easily resulting in the devitrification of the glass, and the thermal expansion coefficient becomes too high, with the result that the thermal shock resistance lowers and it becomes difficult to match the thermal expansion coefficient with those of peripheral materials. Further, viscosity at low temperature becomes too low, and stress relaxation is liable to occur, with the result that the compressive stress value lowers contrarily in some cases. Thus, a suitable upper limit range of the content of $Li_2O$ is 2% or less, 1.7% or less, 1.5% or less, 1% or less, less than 1.0%, 0.5% or less, 0.3% or less, 0.2% or less, particularly 0.1% or less. When $Li_2O$ is added, a suitable addition amount thereof is 0.005% or more, 0.01% or more, particularly 0.05% or more.

$K_2O$ is a component that promotes ion exchange and is a component that allows the depth of layer to be easily enlarged among alkali metal oxides. $K_2O$ is also a component that lowers the viscosity at high temperature to increase the meltability and the formability. Further, $K_2O$ is also a component that improves the devitrification resistance. However, when the content of $K_2O$ is too large, the thermal expansion coefficient becomes too high, the thermal shock resistance lowers, and it becomes difficult to match the thermal expansion coefficient with those of peripheral materials. In addition, the strain point lowers excessively, and the glass composition loses its component balance, with the result that the devitrification resistance tends to lower contrarily. Thus, a suitable upper limit range of the content of $K_2O$ is 10% or less, 9% or less, 8% or less, 7% or less, 6% or less, 5% or less, 4% or less, 3% or less, 2.5% or less, particularly less than 2%. When $K_2O$ is added, a suitable addition amount thereof is 0.1% or more, 0.5% or more, particularly 1% or more. In addition, when the addition of $K_2O$ is avoided as much as possible, the addition amount thereof is preferably from 0% to 1.9%, from 0% to 1.35%, from 0% to 1%, or from 0% to less than 1%, particularly preferably from 0% to 0.05%.

When the content of $Li_2O+Na_2O+K_2O$ is excessively low, the ion exchange performance and the meltability are liable to lower. Meanwhile, when the content of $Li_2O+Na_2O+K_2O$ is excessively high, there is a tendency that the thermal expansion coefficient increases excessively, with the result that the thermal shock resistance lowers, it becomes difficult to match the thermal expansion coefficient with those of peripheral materials, and the density increases. There is also a tendency that the strain point lowers excessively and the glass composition loses its component balance, with the result that the devitrification resistance lowers contrarily. Thus, a suitable lower limit range of the content of $Li_2O+Na_2O+K_2O$ is 5% or more, 6% or more, 7% or more, 8% or more, 9% or more, 10% or more, 11% or more, particularly 12% or more, and a suitable upper limit range thereof is 30% or less, 25% or less, 20% or less, 19% or less, 18.5% or less, 17.5% or less, 16% or less, 15.5% or less, 15% or less, 14.5% or less, particularly 14% or less. The term "content of $Li_2O+Na_2O+K_2O$" refers to the total content of $Li_2O$, $Na_2O$, and $K_2O$.

MgO is a component that reduces the viscosity at high temperature to enhance the meltability and the formability, and increases the strain point and the Young's modulus, and is a component that has a great effect of enhancing the ion exchange performance among alkaline earth metal oxides. Thus, a suitable lower limit range of the content of MgO is 0% or more, 0.5% or more, 1% or more, 1.5% or more, 2% or more, 2.5% or more, 3% or more, 4% or more, particularly 4.5% or more. However, when the content of MgO is too large, the density and the thermal expansion coefficient are liable to increase, and the devitrification of the glass tends to occur easily. In particular, when the glass sheet is formed by the overflow down-draw method through the use of an alumina forming body, a devitrified crystal of spinel is liable to be deposited at an interface between the glass and the alumina forming body. Thus, a suitable upper limit range of the content of MgO is 10% or less, 9% or less, 8% or less, 7% or less, 6% or less, particularly 5% or less.

CaO has greater effects of reducing the viscosity at high temperature to enhance the meltability and the formability, and increasing the strain point and the Young's modulus without involving a reduction in devitrification resistance as compared to other components. However, when the content of CaO is too large, there is a tendency that the density and the thermal expansion coefficient increase, and the glass composition loses its component balance, with the result that the glass is liable to devitrify contrarily, the ion exchange performance lowers, and the deterioration of a molten salt is liable to occur. Thus, the content of CaO is preferably from 0% to 6%, from 0% to 5%, from 0% to 4%, from 0% to 3.5%, from 0% to 3%, from 0% to 2%, or from 0% to 1%, particularly preferably from 0% to 0.5%.

SrO is a component that reduces the viscosity at high temperature to enhance the meltability and the formability, and increases the strain point and the Young's modulus. However, when the content of SrO is too large, an ion exchange reaction is liable to be inhibited, and moreover, the density and the thermal expansion coefficient increase, and the devitrification of the glass is liable to occur. Thus, the content of SrO is preferably from 0% to 1.5%, from 0% to 1%, from 0% to 0.5%, or from 0% to 0.1%, particularly preferably from 0% to less than 0.1%.

BaO is a component that reduces the viscosity at high temperature to enhance the meltability and the formability, and increases the strain point and the Young's modulus. However, when the content of BaO is too large, the ion exchange reaction is liable to be inhibited, and moreover, the density and the thermal expansion coefficient increase, and the devitrification of the glass is liable to occur. Thus, the content of BaO is preferably from 0% to 6%, from 0% to 3%, from 0% to 1.5%, from 0% to 1%, from 0% to 0.5%, or from 0% to 0.1%, particularly preferably from 0% to less than 0.1%.

When the content of MgO+CaO+SrO+BaO is excessively high, there is a tendency that the density and the thermal expansion coefficient increase, the glass devitrifies, and the ion exchange performance lowers. Thus, the content of MgO+CaO+SrO+BaO is preferably from 0% to 9.9%, from 0% to 8%, from 0% to 7%, from 0% to 6.5%, from 0% to 6%, or from 0% to 5.5%, particularly preferably from 0% to 5%. The term "content of MgO+CaO+SrO+BaO" refers to the total content of MgO, CaO, SrO, and BaO.

When the content of $Li_2O+Na_2O+K_2O+MgO+CaO+SrO+BaO$ is excessively low, the meltability is liable to lower. Thus, a suitable lower limit range of the content of $Li_2O+Na_2O+K_2O+MgO+CaO+SrO+BaO$ is 10% or more, 12% or more, 13% or more, 14% or more, 15% or more, 15.5% or more, 16% or more, 17% or more, particularly 17.5% or more. Meanwhile, when the content of $Li_2O+Na_2O+K_2O+MgO+CaO+SrO+BaO$ is excessively high, there is a tendency that the density and the thermal expansion coefficient increase, and the ion exchange performance lowers. Thus, a suitable upper limit range of the content of $Li_2O+Na_2O+K_2O+MgO+CaO+SrO+BaO$ is 30% or less, 28% or less, 25% or less, 24% or less, 23% or less, 22% or less, 21% or less, particularly 20% or less. The term "content of $Li_2O+Na_2O+K_2O+MgO+CaO+SrO+BaO$" refers to the total content of $Li_2O$, $Na_2O$, $K_2O$, MgO, CaO, SrO, and BaO.

When a molar ratio $B_2O_3/(B_2O_3+Li_2O+Na_2O+K_2O+MgO+CaO+SrO+BaO)$ reduces, the crack resistance is liable to lower, and the density and the thermal expansion coefficient are liable to increase. Meanwhile, when the molar ratio $B_2O_3/(B_2O_3+Li_2O+Na_2O+K_2O+MgO+CaO+SrO+BaO)$ increases, the devitrification resistance is liable to lower, the glass is liable to undergo phase separation, and the ion exchange performance is liable to lower. Thus, a suitable range of the molar ratio $B_2O_3/(B_2O_3+Li_2O+Na_2O+K_2O+MgO+CaO+SrO+BaO)$ is from 0.001 to 0.5, from 0.005 to 0.45, from 0.01 to 0.4, from 0.03 to 0.35, particularly from 0.06 to 0.35. The term "$B_2O_3+Li_2O+Na_2O+K_2O+MgO+CaO+SrO+BaO$" refers to the total content of $B_2O_3$, $Li_2O$, $Na_2O$, $K_2O$, MgO, CaO, SrO, and BaO.

$TiO_2$ is a component that enhances the ion exchange performance, and is also a component that reduces the viscosity at high temperature. However, when the content of $TiO_2$ is too large, the glass is liable to be colored and to devitrify. Thus, the content of $TiO_2$ is preferably from 0% to 4.5%, from 0% to 1%, from 0% to 0.5%, from 0% to 0.3%, from 0% to 0.1%, or from 0% to 0.05%, particularly preferably from 0% to 0.01%.

$ZrO_2$ is a component that remarkably enhances the ion exchange performance, and is also a component that increases the viscosity of glass around the liquidus viscosity and the strain point. Thus, a suitable lower limit range of the content of $ZrO_2$ is 0.001% or more, 0.005% or more, 0.01% or more, particularly 0.05% or more. However, when the content of $ZrO_2$ is too large, there is a risk in that the devitrification resistance may lower markedly and the crack resistance may lower, and there is also a risk in that the density may increase excessively. Thus, a suitable upper limit range of the content of $ZrO_2$ is 5% or less, 4% or less, 3% or less, 2% or less, 1% or less, 0.5% or less, 0.3% or less, particularly 0.1% or less.

ZnO is a component that enhances the ion exchange performance and is a component that has a great effect of increasing the compressive stress value, in particular. In addition, ZnO is a component that reduces the viscosity at high temperature without reducing the viscosity at low temperature. However, when the content of ZnO is too large, there is a tendency that the glass undergoes phase separation, the devitrification resistance lowers, the density increases, and the depth of layer decreases. Thus, the content of ZnO is preferably from 0% to 6%, from 0% to 5%, or from 0% to 3%, particularly preferably from 0% to 1%.

$P_2O_5$ is a component that enhances the ion exchange performance and is a component that increases the depth of layer, in particular. However, when the content of $P_2O_5$ is too large, the glass undergoes phase separation, and the water resistance is liable to lower. Thus, the content of $P_2O_5$ is preferably from 0% to 10% or from 0% to 8%, particularly preferably from 0.01% to 0.7%.

As a fining agent, one kind or two or more kinds selected from the group consisting of Cl, $SO_3$, and $CeO_2$ (preferably the group consisting of Cl and $SO_3$) may be added at from 0% to 3%.

$SnO_2$ has an effect of enhancing the ion exchange performance. Thus, the content of $SnO_2$ is preferably from 0% to 3%, from 0.01% to 3%, from 0.05% to 3%, particularly from 0.1% to 3%, particularly preferably from 0.2% to 3%.

The content of $SnO_2+SO_3+Cl$ is preferably from 0.01% to 3%, from 0.05% to 3%, or from 0.1% to 3%, particularly preferably from 0.2% to 3% from the viewpoint of simultaneously achieving a fining effect and an effect of enhancing the ion exchange performance. The term "content of $SnO_2+SO_3+Cl$" refers to the total content of $SnO_2$, Cl, and $SO_3$.

The content of $Fe_2O_3$ is preferably less than 1,000 ppm (less than 0.1%), less than 800 ppm, less than 600 ppm, or less than 400 ppm, particularly preferably less than 300 ppm. Further, the molar ratio $Fe_2O_3/(Fe_2O_3+SnO_2)$ is controlled to preferably 0.8 or more or 0.9 or more, particularly preferably 0.95 or more, while the content of $Fe_2O_3$ is controlled in the above-mentioned range. With this, the transmittance (400 nm to 770 nm) of glass having a thickness of 1 mm is easily improved (for example, 90% or more).

A rare earth oxide, such as $Nb_2O_5$ or $La_2O_3$, is a component that enhances the Young's modulus. However, the cost of the raw material itself is high, and when the rare earth oxide is added in a large amount, the devitrification resistance is liable to lower. Thus, the content of the rare earth oxide is preferably 3% or less, 2% or less, 1% or less, or 0.5% or less, particularly preferably 0.1% or less.

In addition, it is preferred that the glass to be tempered be substantially free of $As_2O_3$, $Sb_2O_3$, and PbO as a glass composition from the standpoint of environmental considerations. In addition, it is also preferred that the glass to be tempered be substantially free of $Bi_2O_3$ and F from the standpoint of environmental considerations.

The glass sheet to be tempered may be produced as described below.

First, glass raw materials, which have been blended so as to have the above-mentioned glass composition, are loaded in a continuous melting furnace, are melted by heating at from 1,500° C. to 1,600° C., and are fined. After that, the resultant is fed to a forming apparatus, is formed into, for example, a sheet shape, and is annealed. Thus, the glass sheet to be tempered can be produced.

An overflow down-draw method is preferably adopted as a method of forming the glass sheet. The overflow down-draw method is a method by which a high-quality glass sheet can be produced in a large amount, and by which even a large-size glass sheet can be easily produced. In addition, the method allows scratches on the surface of the glass sheet to be reduced to the extent possible. In the overflow down-draw method, alumina or dense zircon is used as a forming body. The glass to be tempered according to the present invention has satisfactory compatibility with alumina or dense zircon, in particular, alumina (hardly produces bubbles, stones, and the like through a reaction with the forming body).

Various forming methods other than the overflow downdraw method may also be adopted. For example, forming methods, such as a float method, a down draw method (such as a slot down method or a re-draw method), a roll out method, and a press method, may be adopted.

After the forming of the glass sheet to be tempered, bending processing may be performed as required. In addition, chamfering processing may be performed as required. The chamfering processing is preferably performed before the ion exchange treatment. With this, the compressive stress layer 2 can also be formed on the end surface of the glass sheet.

The glass sheet is preferably cut into desired dimensions before each tempering step to be described below. With this, the compressive stress layer 2 can also be formed on the end surface.

The thickness of the glass to be tempered (sheet thickness in the case of a glass sheet) is preferably 2.0 mm or less, 1.5 mm or less, 1.3 mm or less, 1.1 mm or less, 1.0 mm or less, 0.8 mm or less, 0.7 mm or less, 0.55 mm or less, 0.5 mm or less, 0.45 mm or less, 0.4 mm or less, or 0.35 mm or less, particularly preferably 0.30 mm or less, while the dimensions of the glass to be tempered may be arbitrarily determined. Meanwhile, when the sheet thickness is excessively small, desired mechanical strength is difficult to obtain. Thus, the sheet thickness is preferably 0.05 mm or more, 0.10 mm or more, or 0.15 mm or more, particularly preferably 0.10 mm or more.

The glass to be tempered obtained as described above is subjected to the ion exchange treatment a plurality of times. In this embodiment, description is given by taking a case in which the ion exchange treatment is performed twice as an example. In the present invention, a case in which the ion exchange treatment is performed three or more times is not excluded.

In the first tempering step, the ion exchange treatment of the surface of the glass to be tempered is performed by: immersing the glass to be tempered in a tank filled with the first tempering liquid formed of a molten alkali nitrate; and holding the glass to be tempered at a predetermined temperature for a predetermined time period. The molten alkali nitrate is, for example, a salt formed of at least any one of the following salts and a mixed salt obtained by combining the salts: $LiNO_3$, $KNO_3$, and $NaNO_3$.

The content of $LiNO_3$ in the first tempering liquid is preferably 1 mass % or less or 0.5 mass % or less, particularly preferably 0.1 mass % or less. The content of $LiNO_3$ in the molten salt to be used in the second tempering step is preferably 1 mass % or less or 0.5 mass % or less, particularly preferably 0.1 mass % or less. When the content of $LiNO_3$ in the molten salt is excessively large, it becomes difficult to properly perform the ion exchange treatment.

The content of $KNO_3$ in the first tempering liquid is preferably from 50 mass % to 85 mass % or from 60 mass % to 80 mass %, particularly preferably from 65 mass % to 75 mass %. When the concentration of $KNO_3$ in the molten salt is excessively high, there is a risk in that a compressive stress in the deep portion of the compressive stress layer 2 becomes excessively large, and as a result, an internal tensile stress becomes excessively large. Meanwhile, when the $KNO_3$ concentration is excessively low, the compressive stress layer 2 to be formed becomes small, and hence its strength to breakage due to the press-fitting of, for example, a protruding object reduces.

In addition, the content of $NaNO_3$ in the molten salt to be used in the first tempering step is preferably from 15 mass % to 50 mass % or from 20 mass % to 40 mass %, particularly preferably from 25 mass % to 35 mass %. When the concentration of $NaNO_3$ in the molten salt is excessively low, there is a risk in that a compressive stress in the deep portion of the compressive stress layer 2 becomes excessively large, and as a result, an internal tensile stress becomes excessively large. Meanwhile, when the $NaNO_3$ concentration is excessively high, the compressive stress layer 2 to be formed becomes small, and hence its strength to breakage due to the press-fitting of, for example, a protruding object reduces.

Although values for the DZ, the DT, and the CS(25) described above can be controlled by various elements, the values can be controlled to some extent by controlling, for example, the concentration of $NaNO_3$ in the molten salt to be used in the first tempering step. Specifically, as the $NaNO_3$ concentration is reduced, the DZ, the DT, and the CS (25) can be controlled to larger values.

An ion exchange treatment temperature (the temperature of the molten salt) in the first tempering step is preferably 413° C. or more, 420° C. or more, or 430° C. or more, particularly preferably from 440° C. to 500° C.

An ion exchange treatment time in the first tempering step is set to be longer than 4 hours, and is preferably from 5 hours to 20 hours. The value for the DZ/DT can be controlled to a small value by lengthening the ion exchange treatment time in the first tempering step, and hence the treatment time is preferably lengthened to the extent that the productivity of the tempered glass does not reduce.

In a step before the first tempering step, preheating is not indispensable to the glass to be tempered. That is, the glass to be tempered at normal temperature may be immersed in the first tempering liquid. Herein, the term "normal temperature" refers to a temperature of from 1° C. to 60° C. In the present invention, when the treatment of a step to be described below is performed, even in the case where the glass to be tempered at normal temperature is used, a tempered glass having a small number of defects and having a high strength is obtained. The preheating may be performed as required for adjusting the values for the DZ, the DT, and the CTM.

The glass to be tempered after the completion of the treatment of the first tempering step (hereinafter referred to as "primary tempered glass") is drawn out of the tank, and is subjected to the treatment of the second tempering step. At this time, the primary tempered glass is preferably washed in a washing step in advance before being subjected to the treatment of the second tempering step. When the washing is performed, it becomes easier to remove a deposit adhering to the primary tempered glass, and hence the ion exchange treatment can be more uniformly performed in the second tempering step, and the contamination of the tempering liquid of the second tempering step caused by bringing the tempering salt to be used in the first tempering step into the second tempering step can be prevented.

In the washing step, for example, a method involving causing the primary tempered glass to relatively pass a washing liquid flowing out of a nozzle, or a method involving immersing the primary tempered glass in a washing tank filled with the washing liquid and pulling up the primary tempered glass may be adopted. An arbitrary liquid, such as industrial water, pure water, or an acidic or alkaline solution adjusted to a predetermined pH, may be used as the washing liquid. The washed primary tempered glass is preferably subjected to draining with an air knife or the like. The primary tempered glass after the washing is more preferably dried. Natural drying, drying with a heating apparatus, such as a heat treatment furnace, or the like may be used as a method of drying the primary tempered glass. However, when the drying is performed with the heating apparatus, the primary tempered glass is preferably treated at such a temperature that its compressive stress does not relax. Specifically, the primary tempered glass is dried in an atmosphere preferably at a temperature lower than at least the treatment temperature of the first tempering step, more preferably at 300° C. or less. In addition, when an arbitrary treatment step except the washing and the drying is further arranged in a process from the first tempering step to the second tempering step, a treatment temperature in the step is also preferably set to a temperature lower than the treatment temperature of the first tempering step.

Also in the second tempering step, as in the first tempering step, the surface of the primary tempered glass is further subjected to ion exchange treatment by: immersing the primary tempered glass in a tank filled with the second tempering liquid formed of a molten alkali nitrate; and holding the primary tempered glass at a predetermined temperature for a predetermined time period. However, the concentration of $KNO_3$ in the second tempering liquid is set to be equal to or more than the concentration of $KNO_3$ in the first tempering liquid. More specifically, the content of $KNO_3$ in the second tempering liquid is preferably 94 mass % or more, 96 mass % or more, 98.2 mass % or more, 99.2 mass % or more, 99.6 mass % or more, or 99.8 mass % or more, particularly preferably from 99.9 mass % to 100 mass %. Thus, it becomes easier to increase the concentration of $K_2O$ in the outermost surface of the compressive stress layer 2.

The ratio of an alkali ion having a small ionic radius (e.g., a Li ion or a Na ion, in particular, a Na ion) in the second tempering liquid is preferably smaller than that in the first tempering liquid. With this, it becomes easier to increase the concentration of a large alkali ion in the outermost surface while increasing the depth of layer. The sizes of alkali ions satisfy the following relationship: Li ion<Na ion<K ion (potassium ion)<Ce ion<Rb ion.

The content of $NaNO_3$ in the second tempering liquid is smaller than the content of $NaNO_3$ in the first tempering liquid by preferably 1 mass % or more, 3 mass % or more, 5 mass % or more, 10 mass % or more, 15 mass % or more, or 20 mass % or more, particularly preferably 25 mass % or more. With this, it becomes easier to increase the concentration of $K_2O$ in the outermost surface of the compressive stress layer 2.

An ion exchange temperature in the second tempering step is lower than the ion exchange temperature in the first tempering step by preferably 10° C. or more, 20° C. or more, 30° C. or more, or 30° C. or more, particularly preferably 50° C. or more. Specifically, the ion exchange temperature in the second tempering step is preferably from 350° C. to less than 410° C., particularly preferably from 360° C. to less than 400° C. With this, it becomes easier to increase the depth of layer in the first tempering step and to increase the concentration of $K_2O$ in the outermost surface of the compressive stress layer 2 in the second tempering step.

An ion exchange treatment time in the second tempering step is set so that the total time of the ion exchange treatment times in the first tempering step and the second tempering step may be preferably 20 hours or less, more preferably from 5 hours to 15 hours. When the total time of the ion exchange treatments is controlled to be short, it becomes easier to control the CTM to a small value.

It is preferred that the ion exchange treatment time in the second tempering step be relatively shorter than the ion exchange treatment time in the first tempering step. Specifically, the ion exchange treatment time in the second tempering step is shorter than the ion exchange treatment time in the first tempering step by preferably 2 hours or more, 3 hours or more, or 4 hours or more, particularly preferably 5 hours or more. When the treatment time is controlled as described above, it becomes easier to increase the depth of layer in the first tempering step and to increase the concentration of $K_2O$ in the outermost surface of the compressive stress layer 2 in the second tempering step, and it becomes easier to suppress a value for the square error $R^2$ to a small value. The ion exchange treatment time in the second tempering step is preferably from 5 minutes to 300 minutes, from 10 minutes to 180 minutes, or from 15 minutes to 150 minutes, particularly preferably from 30 minutes to 130 minutes. When the ion exchange treatment time in the second tempering step is excessively long, it becomes difficult to control the value for the CTM to a small value. Meanwhile, when the ion exchange treatment time in the second tempering step is excessively short, it becomes difficult to control the value for the CS (25) to a sufficiently large value.

In addition, in the second tempering step, the cooling of the glass after the ion exchange is preferably quickly performed. Specifically, particularly when the temperature of the glass is cooled from 350° C. or more to 290° C., a temperature decrease amount per unit time at the time of the cooling is preferably set to be larger than 200° C./h. When the glass is placed in a high-temperature atmosphere after the ion exchange, ion diffusion is accelerated in the glass while no ion is supplied from the outside. Accordingly, there is a risk in that a $KNO_3$ concentration near the surface of the glass excessively reduces to reduce the compressive stress of the surface, and as a result, for example, the strength of the glass reduces in the third mode. The temperature at which the cooling is started is preferably 350° C. or less or 300° C. or less, more preferably 290° C. or less.

The tempered glass 1 of the present invention having the above-mentioned characteristics is obtained by appropriately adjusting the treatment times and the treatment temperatures in the condition ranges of the first tempering step and the second tempering step described above.

In the embodiment, description has been given by taking a case in which the glass is immersed in the respective tempering liquids in the first tempering step and the second tempering step as an example, but the ion exchange treatment of the surface of the glass may be performed by applying the tempering liquid to the surface with a spray, a roller, or the like in each of the steps.

The tempered glass 1 of the present invention preferably further has the following characteristics.

The tempered glass 1 of the present invention has a density of preferably 2.6 g/cm³ or less, 2.55 g/cm³ or less, 2.50 g/cm³ or less, or 2.48 g/cm³ or less, particularly preferably 2.45 g/cm³ or less. As the density becomes smaller, the weight of the tempered glass can be reduced more. The density is easily reduced by increasing the content of $SiO_2$, $B_2O_3$, or $P_2O_3$ in the glass composition or by decreasing the content of an alkali metal oxide, alkaline earth metal oxide, ZnO, $ZrO_2$, or $TiO_2$ in the glass composition. The "density" may be measured by a well-known Archimedes method.

The tempered glass 1 of the present invention has a thermal expansion coefficient in a temperature range of from 30° C. to 380° C. of preferably 100×10⁻⁷/° C. or less, 95×10⁻⁷/° C. or less, 93×10⁻⁷/° C. or less, 90×10⁻⁷/° C. or less, 88×10⁻⁷/° C. or less, 85×10⁻⁷/° C. or less, or 83×10⁻⁷/° C. or less, particularly preferably 82×10⁻⁷/° C. or less. When the thermal expansion coefficient is regulated within the above-mentioned range, the tempered glass is less liable to break owing to thermal shock, and hence the time period required for preheating before ion exchange treatment or annealing after the ion exchange treatment can be shortened. As a result, the production cost of the tempered glass can be reduced. In addition, the thermal expansion coefficient can be easily matched with that of a member such as a metal or an organic adhesive, which makes it easy to prevent the detachment of the member such as the metal or the organic adhesive. The thermal expansion coefficient is easily increased by increasing the content of an alkali metal oxide or alkaline earth metal oxide in the glass composition, and conversely, is easily reduced by reducing the content of the alkali metal oxide or alkaline earth metal oxide.

The tempered glass 1 of the present invention has a temperature at $10^{4.0}$ dPa·s of preferably 1,300° C. or less, 1,280° C. or less, 1,250° C. or less, or 1,220° C. or less, particularly preferably 1,200° C. or less. As the temperature at $10^{4.0}$ dPa·s becomes lower, a burden on a forming facility is reduced more, the forming facility has a longer life, and consequently, the production cost of the tempered glass is easily reduced. The temperature at $10^{4.0}$ dPa·s is easily reduced by increasing the content of an alkali metal oxide, an alkaline earth metal oxide, ZnO, $B_2O_3$, or $TiO_2$ or by reducing the content of $SiO_2$ or $Al_2O_3$.

The tempered glass 1 of the present invention has a temperature at $10^{2.5}$ dPa·s of preferably 1,650° C. or less, 1,600° C. or less, or 1,580° C. or less, particularly preferably 1,550° C. or less. As the temperature at $10^{2.5}$ dPa·s becomes lower, melting at lower temperature can be carried out, and hence a burden on a glass production facility, such as a melting furnace, is reduced more, and bubble quality is improved more easily. That is, as the temperature at $10^{2.5}$ dPa·s becomes lower, the production cost of the tempered glass is easily reduced. Herein, the "temperature at $10^{2.5}$ dPa·s" may be measured by, for example, a platinum sphere pull up method. The temperature at $10^{2.5}$ dPa·s corresponds to a melting temperature. In addition, the temperature at $10^{2.5}$ dPa·s is easily reduced by increasing the content of an alkali metal oxide, alkaline earth metal oxide, ZnO, $B_2O_3$, or $TiO_2$ in the glass composition or by reducing the content of $SiO_2$ or $Al_2O_3$ in the glass composition.

The tempered glass 1 of the present invention has a liquidus temperature of preferably 1,200° C. or less, 1,150° C. or less, 1,100° C. or less, 1,080° C. or less, 1,050° C. or less, or 1,020° C. or less, particularly preferably 1,000° C. or less. As the liquidus temperature becomes lower, the devitrification resistance and the formability are improved more. The liquidus temperature is easily reduced by increasing the content of $Na_2O$, $K_2O$, or $B_2O_3$ in the glass composition or by reducing the content of $Al_2O_3$, $Li_2O$, MgO, ZnO, $TiO_2$, or $ZrO_2$ in the glass composition.

The tempered glass 1 of the present invention has a liquidus viscosity of preferably $10^{4.0}$ dPa·s or more, $10^{4.0}$ dPa·s or more, $10^{4.0}$ dPa·s or more, $10^{5.0}$ dPa·s or more, $10^{5.0}$ dPa·s or more, $10^{5.5}$ dPa·s or more, $10^{5.7}$ dPa·s or more, or $10^{5.8}$ dPa·s or more, particularly preferably $10^{6.0}$ dPa·s or more. As the liquidus viscosity becomes higher, the devitrification resistance and the formability are improved more. In addition, the liquidus viscosity is easily increased by increasing the content of $Na_2O$ or $K_2O$ in the glass composition or by reducing the content of $Al_2O_3$, $Li_2O$, MgO, ZnO, $TiO_2$, or $ZrO_2$ in the glass composition.

EXAMPLES

The tempered glass according to the present invention is hereinafter described based on Examples. The following Examples are merely illustrative. The present invention is by no means limited to these Examples.

A sample was produced as described below. First, glass raw materials were blended so as to comprise as a glass composition, in terms of mol %, 66.3% of $SiO_2$, 11.4% of $Al_2O_3$, 15.2% of $Na_2O$, 0.5% of $B_2O_3$, 0.2% of $Li_2O$, 1.4% of $K_2O$, 4.8% of MgO, and 0.2% of $SnO_2$, and were melted with a platinum pot at 1,600° C. for 21 hours. After that, the resultant molten glass was subjected to flow-down forming from a refractory forming body by using an overflow down-draw method to be formed into a sheet shape having a thickness of 0.4 mm.

Next, the glass to be tempered was subjected to ion exchange treatment under conditions shown in Tables 1 to 3 to provide sheet-shaped tempered glasses (samples Nos. 1 to 21). The samples Nos. 1 to 13 are Examples of the present invention, and the samples Nos. 14 to 21 are Comparative Examples. In each of the samples Nos. 18 to 21, a second ion exchange step is omitted.

The measurement of the following characteristics of the resultant tempered glasses and the strength tests thereof were performed.

TABLE 1

| | | | 1 | 2 | 3 | 4 | 5 | 6 | 7 | 8 |
|---|---|---|---|---|---|---|---|---|---|---|
| First tempering step | Tempering liquid [mass %] | KNO₃ | 59.3 | 59.3 | 59.3 | 66.7 | 70.4 | 59.3 | 59.3 | 59.3 |
| | | NaNO₃ | 40.7 | 40.7 | 40.7 | 33.3 | 29.6 | 40.7 | 40.7 | 40.7 |
| | Temperature [° C.] | | 450 | 450 | 450 | 450 | 450 | 450 | 450 | 450 |
| | Time [h] | | 18 | 9 | 9 | 9 | 9 | 6 | 6 | 5 |
| Second tempering step | Tempering liquid [mass %] | KNO₃ | 100 | 100 | 100 | 100 | 100 | 100 | 100 | 100 |
| | | NaNO₃ | 0 | 0 | 0 | 0 | 0 | 0 | 0 | 0 |
| | Temperature [° C.] | | 390 | 390 | 390 | 390 | 390 | 390 | 390 | 390 |
| | Time [h] | | 1 | 0.5 | 1 | 1 | 1 | 3 | 2 | 4 |
| Straight-line analysis | CS [MPa] | | 940 | 930 | 945 | 930 | 919 | 987 | 986 | 958 |
| | DOL [μm] | | 57.8 | 47.9 | 47.5 | 53.4 | 56.3 | 42.3 | 40.4 | 43.6 |
| | CT [MPa] | | 191 | 146 | 147 | 169 | 180 | 132 | 125 | 133 |
| Curve analysis | DZ [μm] | | 55 | 41.4 | 39.7 | 40.8 | 43.3 | 33.4 | 35.4 | 28.7 |
| | DT [μm] | | 86 | 71 | 68.2 | 73.2 | 77.2 | 59.4 | 57 | 54.3 |
| | CTM [MPa] | | 71 | 52 | 58 | 66 | 70 | 70 | 65 | 71 |
| | DZ/DT | | 0.64 | 0.58 | 0.58 | 0.56 | 0.56 | 0.56 | 0.62 | 0.53 |
| | CS(25) [MPa] | | 108 | 76 | 71 | 92 | 115 | 68 | 59 | 46 |

TABLE 1-continued

|  |  | 1 | 2 | 3 | 4 | 5 | 6 | 7 | 8 |
|---|---|---|---|---|---|---|---|---|---|
| Fitting | R2 | 0.978 | 0.976 | 0.991 | 0.988 | 0.984 | 0.999 | 0.999 | 0.999 |
|  | γ | 63 | 63 | 49 | 56 | 60 | −12 | 16 | −86 |
| Sandpaper ball drop test | #100 | A | A | A | A | A | A | A | A |
|  | #320 [cm] | 27 | 15 | 16 | 26 | 33 | 16 | 15 | 15 |
| Ball drop test [cm] |  | 140 | 125 | 111 | 116 | 143 | 80 | 141 | 64 |
| Ring-on-ring test [MPa] |  | — | — | — | — | — | — | — | — |

TABLE 2

|  |  |  | 9 | 10 | 11 | 12 | 13 |
|---|---|---|---|---|---|---|---|
| First tempering step | Tempering liquid [mass %] | KNO$_3$ | 59.3 | 59.3 | 59.3 | 59.3 | 59.3 |
|  |  | NaNO$_3$ | 40.7 | 40.7 | 40.7 | 40.7 | 40.7 |
|  | Temperature [° C.] |  | 450 | 450 | 450 | 450 | 450 |
|  | Time [h] |  | 5 | 24 | 18 | 12 | 6 |
| Second tempering step | Tempering liquid [mass %] | KNO$_3$ | 100 | 99.3 | 99.3 | 99.3 | 99.3 |
|  |  | NaNO$_3$ | 0 | 0.7 | 0.7 | 0.7 | 0.7 |
|  | Temperature [° C.] |  | 390 | 390 | 390 | 390 | 390 |
|  | Time [h] |  | 1 | 0.75 | 0.75 | 0.75 | 0.75 |
| Straight-line analysis | CS [MPa] |  | 958 | 771 | 785 | 813 | 844 |
|  | DOL [μm] |  | 40.3 | 70 | 68 | 60.1 | 45.8 |
|  | CT [MPa] |  | 121 | 208 | 202 | 174 | 125 |
| Curve analysis | DZ [μm] |  | 27.9 | 57.8 | 55.4 | 48.9 | 36.7 |
|  | DT [μm] |  | 55.3 | 100.3 | 100.7 | 90.1 | 63.8 |
|  | CTM [MPa] |  | 46 | 71 | 68 | 61 | 49 |
|  | DZ/DT |  | 0.51 | 0.58 | 0.55 | 0.54 | 0.57 |
|  | CS(25) [MPa] |  | 17 | 107 | 106 | 96 | 58 |
| Fitting | R2 |  | 0.997 | 0.974 | 0.975 | 0.984 | 0.995 |
|  | γ |  | 33 | 57 | 56 | 52 | 36 |
| Sandpaper ball drop test | #100 |  | A | A | A | A | A |
|  | #320 [cm] |  | 9 | 38 | 27 | 23 | 14 |
| Ball drop test [cm] |  |  | 119 | 86 | 74 | 70 | 65 |
| Ring-on-ring test [MPa] |  |  | — | 378 | 349 | 310 | 268 |

TABLE 3

|  |  |  | 14 | 15 | 16 | 17 | 18 | 19 | 20 | 21 |
|---|---|---|---|---|---|---|---|---|---|---|
| First tempering step | Tempering liquid [mass %] | KNO$_3$ | 74.1 | 81.5 | 59.3 | 59.3 | 95.9 | 99.3 | 95.8 | 99.3 |
|  |  | NaNO$_3$ | 25.9 | 18.5 | 40.7 | 40.7 | 4.1 | 0.7 | 4.2 | 0.7 |
|  | Temperature [° C.] |  | 450 | 450 | 450 | 450 | 430 | 430 | 430 | 390 |
|  | Time [h] |  | 9 | 9 | 6 | 6 | 1.15 | 2.5 | 6.4 | 0.75 |
| Second tempering step | Tempering liquid [mass %] | KNO$_3$ | 100 | 100 | 100 | 100 | — | — | — | — |
|  |  | NaNO$_3$ | 0 | 0 | 0 | 0 | — | — | — | — |
|  | Temperature [° C.] |  | 390 | 390 | 390 | 390 | — | — | — | — |
|  | Time [h] |  | 1 | 1 | 5 | 4 | — | — | — | — |
| Straight-line analysis | CS [MPa] |  | 909 | 869 | 947 | 955 | 778 | 833 | 686 | 828 |
|  | DOL [μm] |  | 59.2 | 65.7 | 44.8 | 44.8 | 25.3 | 40.5 | 58.3 | 14.9 |
|  | CT [MPa] |  | 191 | 213 | 137 | 138 | 56 | 106 | 141 | 33 |
| Curve analysis | DZ [μm] |  | 45.8 | 49 | 34.5 | 35 | 21.9 | 32.7 | 42.4 | 10.9 |
|  | DT [μm] |  | 81.1 | 86.3 | 59.1 | 61.8 | 25.1 | 45.1 | 65.7 | 12.7 |
|  | CTM [MPa] |  | 74 | 87 | 79 | 77 | 41 | 76 | 87 | 25 |
|  | DZ/DT |  | 0.57 | 0.57 | 0.58 | 0.57 | 0.87 | 0.73 | 0.65 | 0.86 |
|  | CS(25) [MPa] |  | 137 | 176 | 114 | 100 | −38 | 119 | 228 | −37 |
| Fitting | R2 |  | 0.98 | 0.976 | 0.999 | 0.999 | 0.998 | 0.999 | 0.999 | 0.997 |
|  | γ |  | 65 | 63 | −64 | −35 | −207 | −295 | −304 | −2,081 |
| Sandpaper ball drop test | #100 |  | B | B | B | B | A | B | B | A |
|  | #320 [cm] |  | 40 | 71 | 27 | 24 | 6 | 35 | 94 | 6 |
| Ball drop test [cm] |  |  | 130 | 108 | 74 | 112 | 33 | 51 | 43 | 28 |
| Ring-on-ring test [MPa] |  |  | — | — | — | — | — | — | — | 144 |

Figure 2:
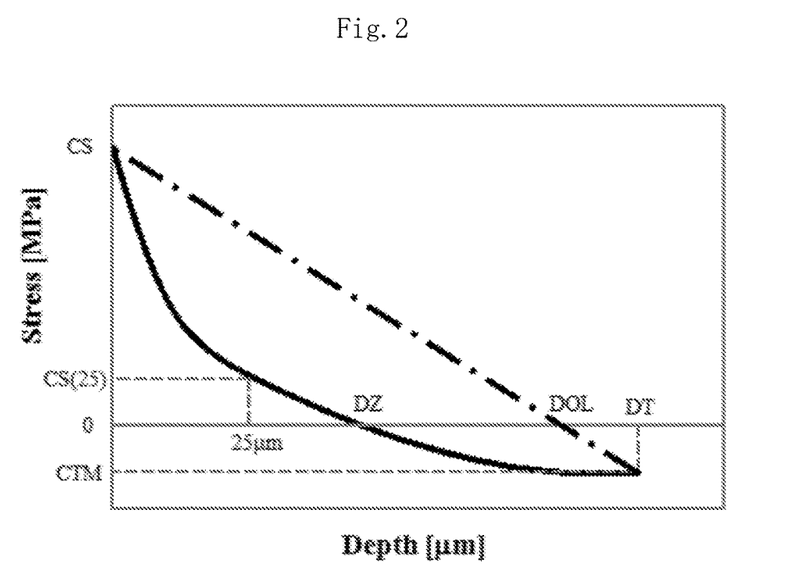
FIG. 2 is a graph for showing the stress distribution of the tempered glass and the definitions of parameters in the present invention.

A maximum compressive stress value CS of a compressive stress layer and a depth of layer DOL of the compressive stress layer based on linear approximation are values calculated from the number of interference fringes observed at the time of the observation of a sample with a surface stress meter FSM-6000LE and application software FsmXP manufactured by Orihara Industrial Co., Ltd., and an interval therebetween. At the time of the calculation, the refractive index and optical elastic constant of the sample were defined as 1.50 and 29.5 [(nm/cm)/MPa], respectively. A tensile stress CT of a tensile stress layer is a value calculated by using the following expression (4) on the basis of the CS and the DOL when the sheet thickness of the sample is represented by t [mm]. That is, the CS, the DOL, and the CT are theoretical calculation values (straight-line analysis values) when the compressive stress is regarded as linearly changing in accordance with the depth as indicated by the dashed line of FIG. 2.

$$CT = (CS \cdot DOL)/(t - 2 \cdot DOL) \qquad (4)$$

A zero stress depth DZ, an alkali metal diffusion depth DT, a maximum tensile stress CTM, and a CS (25) are values measured and calculated with the surface stress meter FSM-6000LE and application software FsmV manufactured by Orihara Industrial Co., Ltd. At the time of the calculation, the refractive index and optical elastic constant of the sample were defined as 1.50 and 29.5 [(nm/cm)/MPa], respectively. The DZ, the DT, and the CTM are calculation values (curve analysis values) when measured values are subjected to curve approximation on the premise that the compressive stress changes in a curved manner in accordance with the depth as indicated by the solid line of FIG. 2, and hence the values are extremely close to an actual stress distribution as compared to the straight-line analysis values.

A square error $R^2$ is a value obtained by fitting a data group of stress values at a depth x measured with the FSM-6000LE manufactured by Orihara Industrial Co., Ltd. with a function represented by the following expression (5), and evaluating the resultant function on the basis of the expression (6). $\alpha$, $\beta$, and $\gamma$ are constants, and the $\alpha$, the $\beta$, and the $\gamma$ were determined by using Excel manufactured by Microsoft Corporation with the $R^2$ as a target value. erfc(x) represents a complementary error function. In addition, i represents a position in a depth direction, $y_i$ represents the measured value of the compressive stress, $f_i$ represents a value for the expression (5) at the position i, and gave represents the average of the compressive stress values. In Table 1, the $R^2$ represents a value rounded down to three decimal places.

$$f = \alpha \cdot erfc(\beta \cdot x) + \gamma \quad (5)$$

$$R^2 = 1 - \{\Sigma_i(y_i - f_i)\}/\{\Sigma_i(y_i - y_{ave})\} \quad (6)$$

The following two sandpaper ball drop tests were performed: a test using sandpaper #100 that was relatively coarse and a test using sandpaper #320 that was relatively fine.

The ball drop test using sandpaper #100 is a test assuming the breakage in the above-mentioned first mode. Specifically, a tempered glass having dimensions of 50 mm in length and 50 mm in width and sandpaper #100 having a dimension of 15 mm per side (arranged so that a rubbing surface thereof was brought into contact with the tempered glass) were arranged on a base made of granite in the stated order, and a steel ball of 4 g was dropped onto the sandpaper from a height of 5 cm. Then, evaluation was made based on the number of chips of the broken tempered glass. 30 samples were tested for each sample No. The sandpaper was exchanged with a new one for each sample. When the number of chips of one sample was less than 20, it was judged that no explosive breakage resulting from an internal stress occurred, and the sample was evaluated as A. Meanwhile, when the number of chips of one sample was 20 or more, it was judged that explosive breakage resulting from an internal stress occurred, and the sample was evaluated as B. When the result of the evaluation is A in the ball drop test using the sandpaper #100, a sample is considered to have a sufficient strength as a display cover glass for a portable device.

The ball drop test using sandpaper #320 is a test assuming the breakage in the above-mentioned second mode. Specifically, an acrylic sheet having a sheet thickness of 30 mm, sandpaper #320 having a dimension of 15 mm per side (arranged so that a rubbing surface thereof was brought into contact with a tempered glass), the tempered glass having dimensions of 50 mm in length and 50 mm in width, and an acrylic sheet having a sheet thickness of 4 mm were laminated and arranged on a base made of a SUS surface plate in the stated order. A steel ball of 130 g was dropped onto the acrylic sheet arranged in the uppermost stage, and the height at which the tempered glass was broken was measured. More specifically, the steel ball was dropped from a height of 5 cm while the dropping height was increased in increments of 5 cm, and the height at which the tempered glass was broken was recorded. The height at which the tempered glass was broken was subjected to Weibull plotting, and the height at which a breakage probability became 63% was determined as an average. When no split occurred even when a crack was formed, it was determined that breakage occurred when the crack formed in a perpendicular direction reached a depth of a half or more of the sheet thickness. When the measured value is 20 cm or more in the ball drop test using the sandpaper #320, a sample is considered to have a sufficient strength as a display cover glass for a portable device.

The ball drop test is a test assuming the breakage in the above-mentioned third mode. Specifically, the edge portion of a tempered glass having dimensions of 65 mm in length and 130 mm in width was mounted on a frame-like jig made of paper bakelite, the jig having an opening at its central portion. A steel ball of 130 g was dropped onto the center of the glass, and the height at which the glass was broken by one collision was recorded. More specifically, the steel ball was dropped from a height of 15 cm while the dropping height was increased in increments of 5 cm, and the height at which the tempered glass was broken was recorded. The height at which the tempered glass was broken was subjected to Weibull plotting, and the height at which a breakage probability became 63% was determined as an average. The end surface of the tempered glass of each sample was ground with a grindstone #800 in advance. In addition, the tempered glass of each sample was mounted on the jig so that the paste margin of each side thereof became 5 mm. When the average is 60 cm or more in the ball drop test, a sample is considered to have a sufficient strength as a display cover glass for a portable device.

The ring-on-ring test is a test assuming the breakage in the above-mentioned fourth mode. Specifically, the surface of a tempered glass having dimensions of 50 mm in length and 50 mm in width was scratched with a Knoop indenter in advance, and an upper ring and a lower ring having different dimensions were pressed against the glass from both of its main surfaces while a load was increased so that a tensile stress was applied thereto, to thereby break the glass, followed by the measurement of a stress value at the time point when the breakage of the glass started from the scratched portion. The scratching was performed by running a Knoop indenter manufactured by Tokyo Diamond Tools Mfg Co., Ltd. on the surface of the tempered glass by a distance of 5 mm under the conditions of an indentation load of 2 N and a scratch speed of 0.5 mm/sec. In addition, the diameter of the upper ring was 12.5 mm, the diameter of the lower ring was 25 mm, and the indentation speed of each of the rings was set to 0.5 ram/min. When the measured value is 250 MPa or more in the ring-on-ring test, a sample is considered to have a sufficient strength as a display cover glass for a portable device.

As shown in Tables 1 to 3, in each of Comparative Examples Nos. 14 to 17, 19, and 20, the result of the ball drop test using the sandpaper #100 was inferior to those of Examples because the CTM deviated from the range of the present invention, and hence the resistance to the breakage in the first mode was low. In addition, in each of Comparative Examples Nos. 18 to 21, the result of the ball drop test was inferior to those of Examples because the value for the DZ/DT deviated from the range of the present invention, and hence the resistance to the breakage in the third mode was low.

Meanwhile, each of the samples of Examples provided a sufficient strength as a display cover glass for a portable device in each of both the ball drop test using the sandpaper #100 and the ball drop test, and hence had high resistance to the breakage in each of the first mode and the third mode.

INDUSTRIAL APPLICABILITY

The tempered glass according to the present invention can be utilized as a glass to be mounted on an electronic device, such as a touch panel, a display, or a solar cell.

The invention claimed is:

1. A tempered glass, comprising, on a surface thereof, a compressive stress layer having a compressive stress, and comprising a tensile stress layer having a tensile stress inside the compressive stress layer,
   wherein the tempered glass satisfies the following expression (1):
   $$DZ/DT<0.65 \quad (1)$$
   where DZ represents a zero stress depth (μm) indicating a depth from the surface to a reference position at which a stress becomes zero between the compressive stress layer and the tensile stress layer, and DT represents an alkali metal diffusion depth (μm) indicating a depth of a region layer, which has diffused therein an alkali metal ion that causes the compressive stress, from the surface, and
   wherein the tempered glass satisfies the following expression (2):
   $$CTM<73 \quad (2)$$
   where CTM represents a maximum tensile stress (MPa).

2. The tempered glass according to claim 1, wherein the tempered glass satisfies the following expression (3):
   $$CS(25) \geq 90 \quad (3)$$
   where CS(25) represents a compressive stress value (MPa) at a depth of 25 μm from the surface.

3. The tempered glass according to claim 1, wherein the alkali metal diffusion depth DT is 50 μm or more.

4. The tempered glass according to claim 1,
   wherein the tempered glass has a thickness of 1.0 mm or less, and
   wherein a maximum value of the compressive stress in the compressive stress layer is 600 MPa or more.

5. The tempered glass according to claim 1, wherein when a function curve indicating a value for the compressive stress with a depth from the surface as a variable is obtained by fitting involving using a complementary error function, a square error of the function curve with respect to the complementary error function is 0.995 or less.

6. The tempered glass according to claim 1, wherein the tempered glass comprises as a glass composition, in terms of mol %, 50% to 80% of $SiO_2$, 5% to 30% of $Al_2O_3$, and 5% to 25% of $Na_2O$.

7. The tempered glass according to claim 6, wherein the tempered glass further comprises as a glass composition, in terms of mol %, 0.01% to 10% of $P_2O_5$ and 0.01% to 3% of $SnO_2$.

8. The tempered glass according to claim 2, wherein the alkali metal diffusion depth DT is 50 μm or more.

9. The tempered glass according to claim 2,
   wherein the tempered glass has a thickness of 1.0 mm or less, and
   wherein a maximum value of the compressive stress in the compressive stress layer is 600 MPa or more.

10. The tempered glass according to claim 3,
    wherein the tempered glass has a thickness of 1.0 mm or less, and
    wherein a maximum value of the compressive stress in the compressive stress layer is 600 MPa or more.

11. The tempered glass according to claim 8,
    wherein the tempered glass has a thickness of 1.0 mm or less, and
    wherein a maximum value of the compressive stress in the compressive stress layer is 600 MPa or more.

12. The tempered glass according to claim 2, wherein when a function curve indicating a value for the compressive stress with a depth from the surface as a variable is obtained by fitting involving using a complementary error function, a square error of the function curve with respect to the complementary error function is 0.995 or less.

13. The tempered glass according to claim 3, wherein when a function curve indicating a value for the compressive stress with a depth from the surface as a variable is obtained by fitting involving using a complementary error function, a square error of the function curve with respect to the complementary error function is 0.995 or less.

14. The tempered glass according to claim 4, wherein when a function curve indicating a value for the compressive stress with a depth from the surface as a variable is obtained by fitting involving using a complementary error function, a square error of the function curve with respect to the complementary error function is 0.995 or less.

15. The tempered glass according to claim 8, wherein when a function curve indicating a value for the compressive stress with a depth from the surface as a variable is obtained by fitting involving using a complementary error function, a square error of the function curve with respect to the complementary error function is 0.995 or less.

16. The tempered glass according to claim 9, wherein when a function curve indicating a value for the compressive stress with a depth from the surface as a variable is obtained by fitting involving using a complementary error function, a square error of the function curve with respect to the complementary error function is 0.995 or less.

17. The tempered glass according to claim 10, wherein when a function curve indicating a value for the compressive stress with a depth from the surface as a variable is obtained by fitting involving using a complementary error function, a square error of the function curve with respect to the complementary error function is 0.995 or less.

18. The tempered glass according to claim 11, wherein when a function curve indicating a value for the compressive stress with a depth from the surface as a variable is obtained by fitting involving using a complementary error function, a square error of the function curve with respect to the complementary error function is 0.995 or less.

19. The tempered glass according to claim 2, wherein the tempered glass comprises as a glass composition, in terms of mol %, 50% to 80% of $SiO_2$, 5% to 30% of $Al_2O_3$, and 5% to 25% of $Na_2O$.

20. The tempered glass according to claim 3, wherein the tempered glass comprises as a glass composition, in terms of mol %, 50% to 80% of $SiO_2$, 5% to 30% of $Al_2O_3$, and 5% to 25% of $Na_2O$.

* * * * *